United States Patent [19]

Gamble

[11] Patent Number: 5,481,908
[45] Date of Patent: Jan. 9, 1996

[54] RESONANCE CONTACT SCANNING FORCE MICROSCOPE

[75] Inventor: Ronald C. Gamble, Pasadena, Calif.

[73] Assignee: Topometrix Corporation, Santa Clara, Calif.

[21] Appl. No.: 55,236

[22] Filed: Apr. 28, 1993

[51] Int. Cl.⁶ .................................................. G01B 11/24
[52] U.S. Cl. ............................................ 73/105; 250/306
[58] Field of Search .............................. 73/105; 250/306, 250/307; 356/376, 377

[56] References Cited

U.S. PATENT DOCUMENTS

| | | | |
|---|---|---|---|
| Re. 33,387 | 10/1990 | Binnig | 250/306 |
| Re. 34,331 | 8/1993 | Elings et al. | 250/306 |
| 4,851,671 | 7/1989 | Pohl | 250/423 F X |
| 5,047,633 | 9/1991 | Finlan et al. | 250/306 |
| 5,144,128 | 9/1992 | Hasegawa et al. | 250/306 |
| 5,289,004 | 2/1994 | Okada et al. | 250/306 |
| 5,291,775 | 3/1994 | Gamble et al. | 73/105 |
| 5,319,960 | 6/1994 | Gamble et al. | 73/105 |
| 5,329,808 | 7/1994 | Elings et al. | 73/105 |

OTHER PUBLICATIONS

Topometrix Corporation, *AFM Imaging Modes*, Mar., 1993 pp. 1–16.

*Primary Examiner*—Thomas P. Noland
*Attorney, Agent, or Firm*—Fulwider Patton Lee & Utecht

[57] ABSTRACT

The resonance contact scanning force microscope includes a reflective cantilever arm which is oscillated at a high harmonic of the resonance frequency of the cantilever arm, while the probe tip is maintained in substantially constant contact with the surface of the specimen. The motion of the free end of the cantilever arm is measured, to generate a deflection signal indicative of the amount of actual deflection of the probe tip. The method and apparatus permit high speed scans and real time imaging of the surface of a specimen with a substantial reduction in noise normally arising due to tip-surface interaction and acoustic noise.

17 Claims, 7 Drawing Sheets

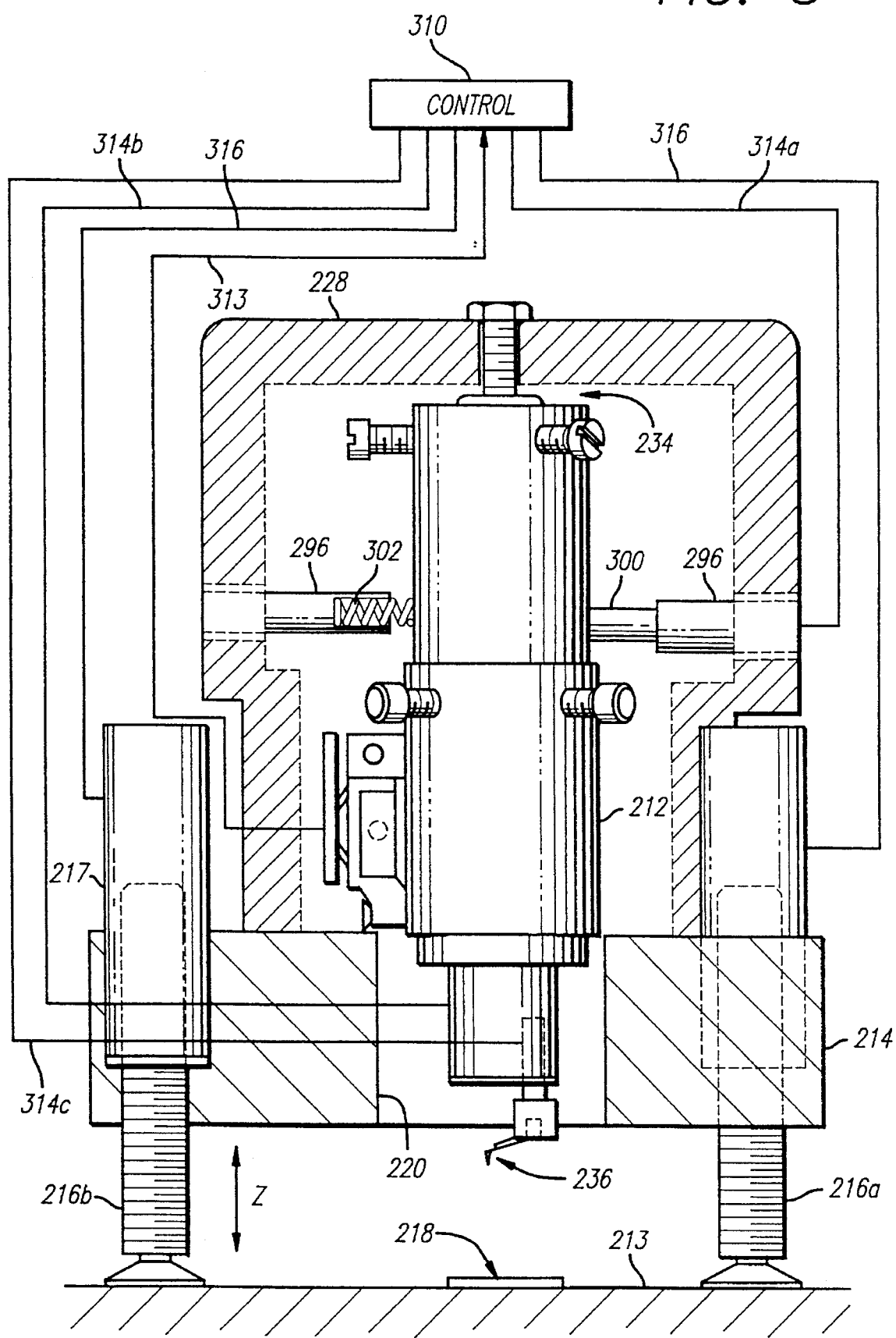

RESONANCE CONTACT SCANNING FORCE MICROSCOPE

BACKGROUND OF THE INVENTION

1. Field of the Invention

This invention relates generally to scanning force microscopes, and more particularly concerns a scanning atomic force microscope with an oscillating cantilever probe and a modulated resonance contact mode of operating the microscope for imaging surface contours of a specimen.

2. Description of Related Art

Scanning force microscopes, also known as atomic force microscopes, are useful for imaging objects as small as atoms. Scanning force microscopy is closely related to scanning tunneling microscopy and the technique of stylus profilometry. In a scanning force microscope, a laser beam is typically deflected by the free end of a reflective lever arm to which the probe is mounted, indicative of vertical movement of the probe as it follows the contours of a specimen. The deflection of the laser beam is typically monitored by a photosensor in the optical path of the deflected laser beam, and the sample is mounted on a stage moveable in minute distances in three dimensions. The sample can be raster scanned while the vertical positioning of the probe relative to the surface of the sample is maintained substantially constant by a feedback loop with the photosensor controlling the vertical positioning of the sample.

The interactive forces between the probe and surface of the specimen change at different distances. As the probe approaches the surface of an uncontaminated specimen, it is initially attracted to the surface by relatively long range attractive forces, such as van der Waals forces. As the probe tip approaches further, repulsive forces from the electron orbitals of the atoms on the probe tip and the specimen surface become more significant. Under normal ambient conditions, the surface of a specimen will also be covered by a thin contamination layer, typically composed of water and other ambient contaminants, and contaminants remaining from production of the specimen. The thickness of the contamination layer can vary due to humidity and specific ambient conditions, but is generally between 25 and 500 Å. This contamination layer can also have an interactive effect on the probe tip. As the probe tip approaches the contamination layer of a specimen, capillary surface forces can strongly attract the probe tip toward the surface of the specimen. When the probe tip is being retracted from the surface of the specimen, the capillary attraction forces can also strongly resist retraction of the probe tip from the surface of the specimen.

In conventional non-modulated modes of operating atomic force microscopes, where the lever arm is not oscillated, output from the detector monitoring the deflection of the reflective probe lever arm is typically used as feedback to adjust the position of the probe tip to maintain the interactive forces and distance between the probe tip and specimen surface substantially constant. In a conventional non-modulated, DC-contact mode of operation, the detected displacement of the probe is used in a feedback loop to adjust the position of the probe so that the force between the probe and the specimen surface remains substantially constant. It has been observed that in a non-modulated contact scanning mode, high rates of scanning, i.e. at four scan lines per second over a 50 micron range, can result in a hydroplaning effect, with the probe tip skimming over the surface of a contaminant layer, causing an unusual amount of noise to be present in the output signal.

In modulated modes of operating a scanning force microscope, the reflective lever arm is typically mounted to a piezoelectric ceramic material which can be driven by an alternating voltage to cause the lever arm and the probe tip to oscillate at a desired frequency. In modulated "non-contact" and "intermittent contact" scanning modes, as the oscillating probe tip approaches the surface of the specimen, both the amplitude and phase shift of the probe relative to the driving oscillator are perturbed by the surface forces. Measurements are typically made of the average cantilever amplitude or the shift in phase of the cantilever relative to the driven oscillation, in order to monitor the interaction of the tip with the attractive and repulsive forces of the surface of the sample, generally due to a contaminant layer on the surface of the sample, in ambient, open air conditions. Either the change in amplitude or the change in phase can typically be used in a positioning feedback loop.

In a conventional high amplitude resonance modulation mode, in which the probe is oscillated at its resonant frequency, typically at 50–500 kHz, at a high amplitude of from 100 to 1,000 Å, the probe has intermittent contact with the surface of the specimen, rapidly moving in and out of the contamination layer. In this mode, the topographical image is not significantly affected by the contamination layer, since the probe rapidly penetrates this layer. Either the probe or the sample can be damaged in this mode, which is more appropriate for imaging soft specimens. In a conventional low amplitude resonance mode, in which the probe tip is also typically oscillated at it resonance frequency at from 50–500 KHz at a low amplitude, the probe remains within the contamination layer, in the attractive region. However, since the contamination layer can change, due to warming of the specimen, changes in humidity or other ambient surface conditions, images made with in this mode of operation can also change unpredictably.

Resonance modes of operation also present special problems, in that changes in amplitude and phase during oscillation of the lever arm due to long and short range forces occurring between the tip and the surface of the sample are most greatly affected when the frequency is at or near the fundamental resonance frequency. At resonance, the oscillation is quickly damped when the probe tip is at or near the sample surface. The quality factor, Q, of the oscillating lever arm at resonance further increases the effect of the interacting surface forces on the amplitude and phase shift. For a single optical lever arm made of silicon (100 microns long, 15 microns wide, 6 microns thick), the resonance frequency is about 300 Khz, and the Q factor is well over 100 in air. However, operation of a scanning force microscope with a lever arm having a high Q factor in "non-contact" mode at the resonance frequency can cause "ringing" problems, reducing frequency response. Consequently, conventional resonance modes of operation typically result in low resolution imaging of the surface of a specimen.

It has been found that the quality of scanning force microscope images for small scan ranges, i.e. less than about 1 micron, and with surfaces having small features, i.e. less than about 20 nm, is limited by noise from the dynamics of tip-surface interaction and acoustic noise. Acoustic noise combined with possible resonance feedback from a normal laboratory environment can also result in reduced image resolution, particularly when a probe is oscillated at lower frequencies, such as from 10–100 KHz. At high scan rates, such as five scan lines per second over a 400 nm range, acoustic noise can be as much as 10 Å in comparison to features of from 10–15 Å. Factors such as feedback control settings, the scan rate, and the frequency characteristics of the lever arm of the probe can affect the amount of noise encountered, but tip-surface interaction noise and acoustic noise typically can easily exceed design performance of the microscope, causing streaks in the images of specimens which are much longer than the effective tip-contact radius.

It would be desirable to provide a way of overcoming problems of noise and differences in interaction of the probe tip with a contamination layer to provide for high resolution imaging at high scan rates. The present invention addresses these needs.

SUMMARY OF THE INVENTION

Briefly, and in general terms, the present invention provides for a scanning force microscope with an oscillating cantilever probe, and a resonance contact method for using the microscope which allows high speed scanning of surface contours of a specimen for producing an image of the specimen surface contours. The invention also provides for reduction of noise in specimen images due to tip-surface interaction and acoustic noise, which is useful for improved resolution from both high and low speed scans.

The invention accordingly provides for a resonance contact scanning force microscope for examining surface contours of a specimen. The microscope has a body including a reflective cantilever arm having a first end secured to the body. The cantilever arm is oscillated at a desired frequency which is preferably a very high resonance harmonic of the resonance frequency of the cantilever arm, and is preferably between about 0.1 and 2 MHz. A probe is secured to the free end of the cantilever arm, and includes a probe tip adapted to maintain substantially constant contact with and follow the surface contours of the specimen with a substantially constant amount of force. Scanning means are provided for scanning the specimen relative to the probe tip. Means are provided for measuring the deflection of the free end of the oscillating cantilever arm, operating to generate a deflection signal indicative of the deflection of the probe at the free end of the cantilever arm. The means for measuring the deflection of the free end of the oscillating cantilever arm preferably comprises a light source means mounted to the body for producing a focused beam directed at and deflected by the free end of the reflective cantilever arm, with photosensor means mounted to the body for receiving the reflected beam deflected by the cantilever arm. In one presently preferred embodiment, the light source is a laser light source.

The invention also provides a method for oscillating the probe cantilever arm of the scanning force microscope in a resonance contact mode for examining surface contours of a specimen. The method generally involves oscillating the cantilever arm at a desired frequency, preferably at a very high resonance harmonic of the resonance frequency of the cantilever arm of the microscope, and preferably between about 0.1 and 2 MHz. Deflection signal data indicative of the surface contours of the specimen are then generated based upon the measured deflection of the free (probe) end of the cantilever arm. The signal data can then be used for creating an image of the surface contours of the specimen.

These and other aspects and advantages of the invention will become apparent from the following detailed description, and the accompanying drawings, which illustrate by way of example the features of the invention.

BRIEF DESCRIPTION OF THE DRAWINGS

FIG. 8 is a diagrammatic side view of alternate embodiment of a resonance contact scanning force microscope of the invention placed on a substrate for examination;

DETAILED DESCRIPTION OF THE PREFERRED EMBODIMENTS

In non-modulated contact scanning modes of operation used with scanning force microscopes, high scan rates can produce noise in specimen images due to a hydroplaning effect, acoustic noise, and tip-surface interaction effects. In modulated contact scanning modes, at or near the resonance frequency of the probe lever arm, oscillation of the probe lever arm is quickly damped when the probe tip is at or near the sample surface. Operation of a scanning force microscope with a lever arm having a high Q factor at the resonance frequency can also cause "ringing" problems, reducing frequency response.

The present invention provides for noise reduction, at high or low scan rates of a scanning force microscope, by oscillating the probe cantilever arm of the microscope at a frequency which is a very high resonance harmonic of the resonant frequency of the cantilever arm while the probe tip is maintained in substantially constant contact with the surface of the specimen to overcome these problems.

Figure 1:
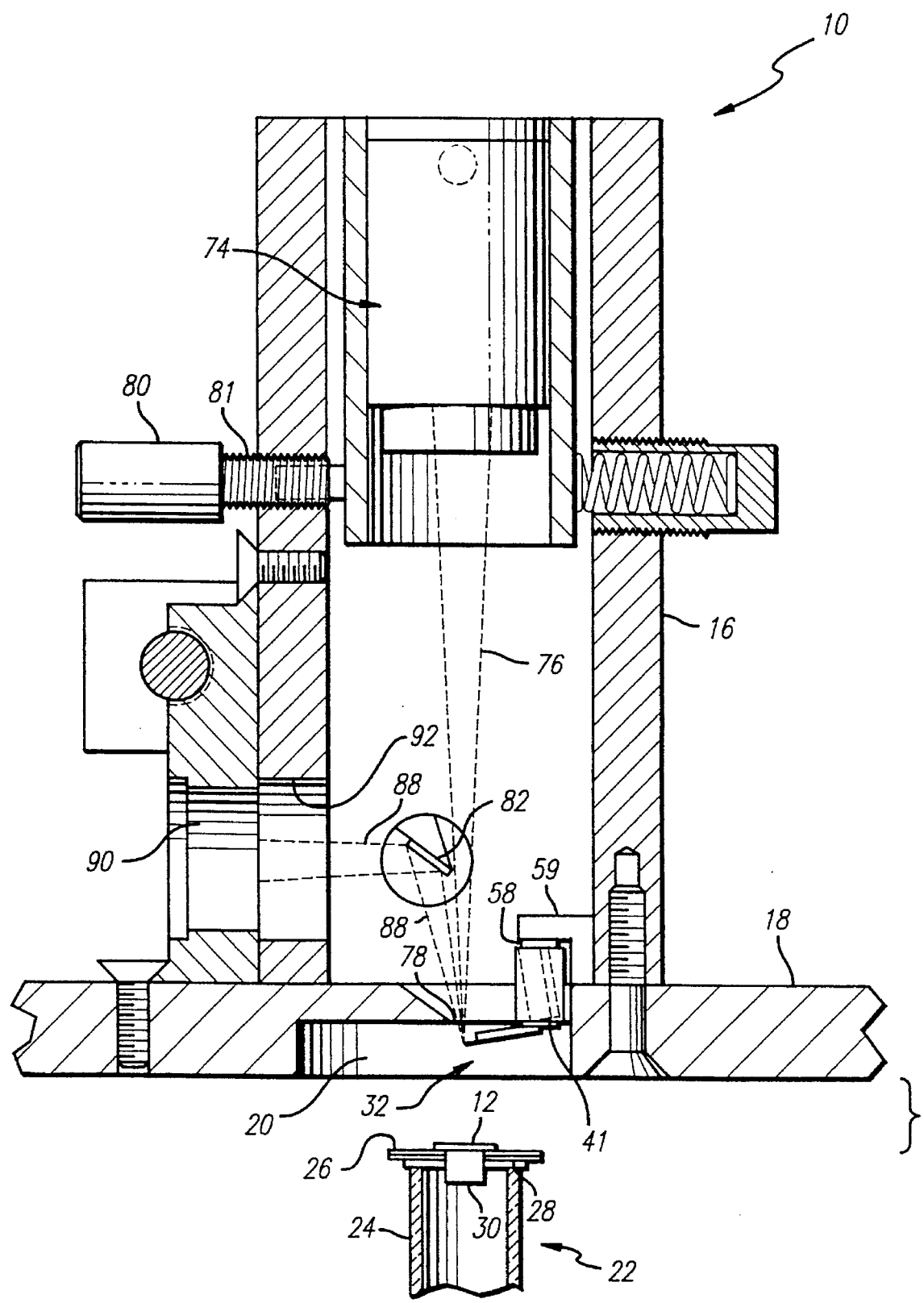
FIG. 1 is a sectional view of a resonance contact scanning force microscope of the present invention.
Figure 2:
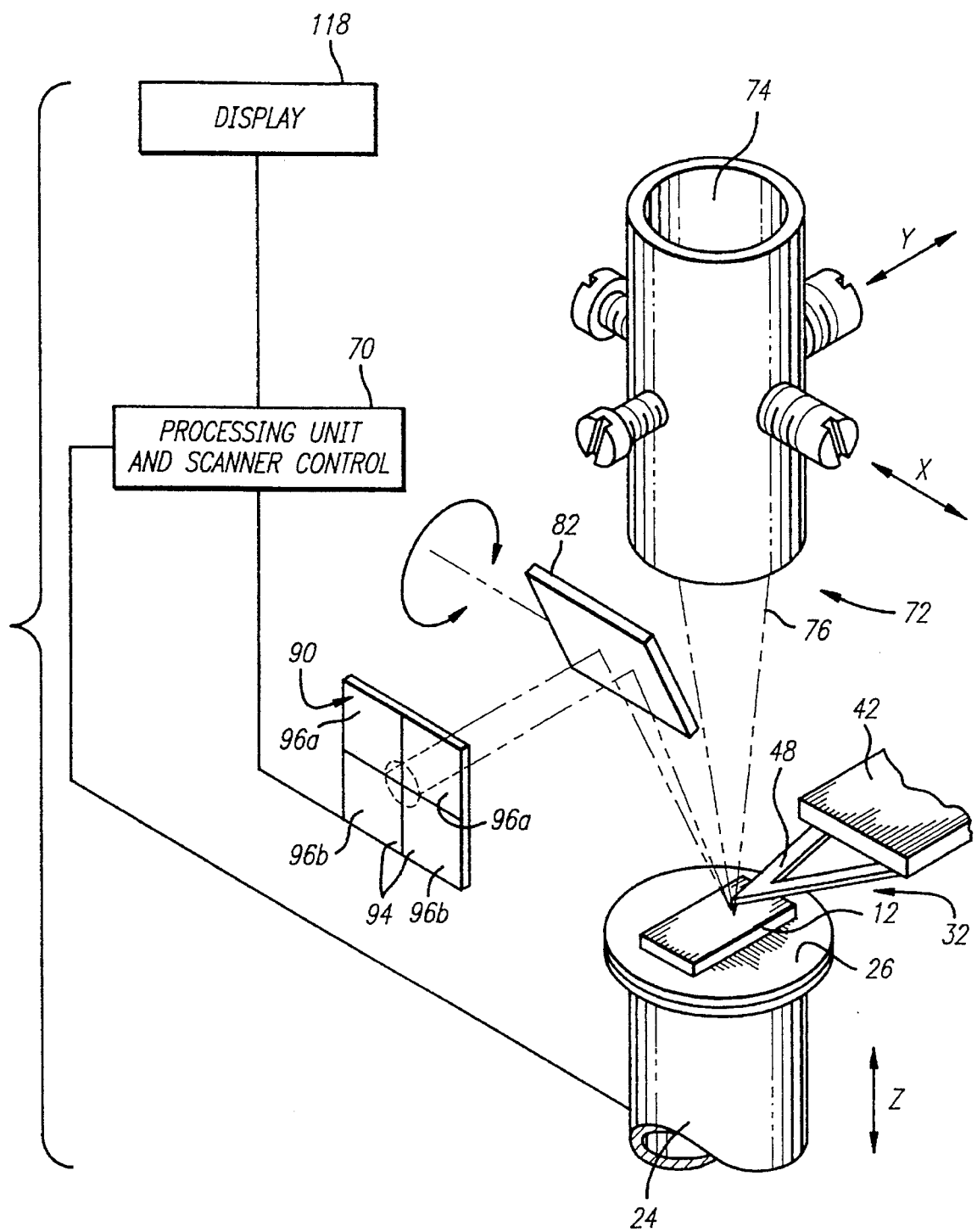
FIG. 2 is an exploded diagrammatic perspective view illustrating the spatial relationships of major elements of the resonance contact scanning force microscope of the present invention.
Figure 3:
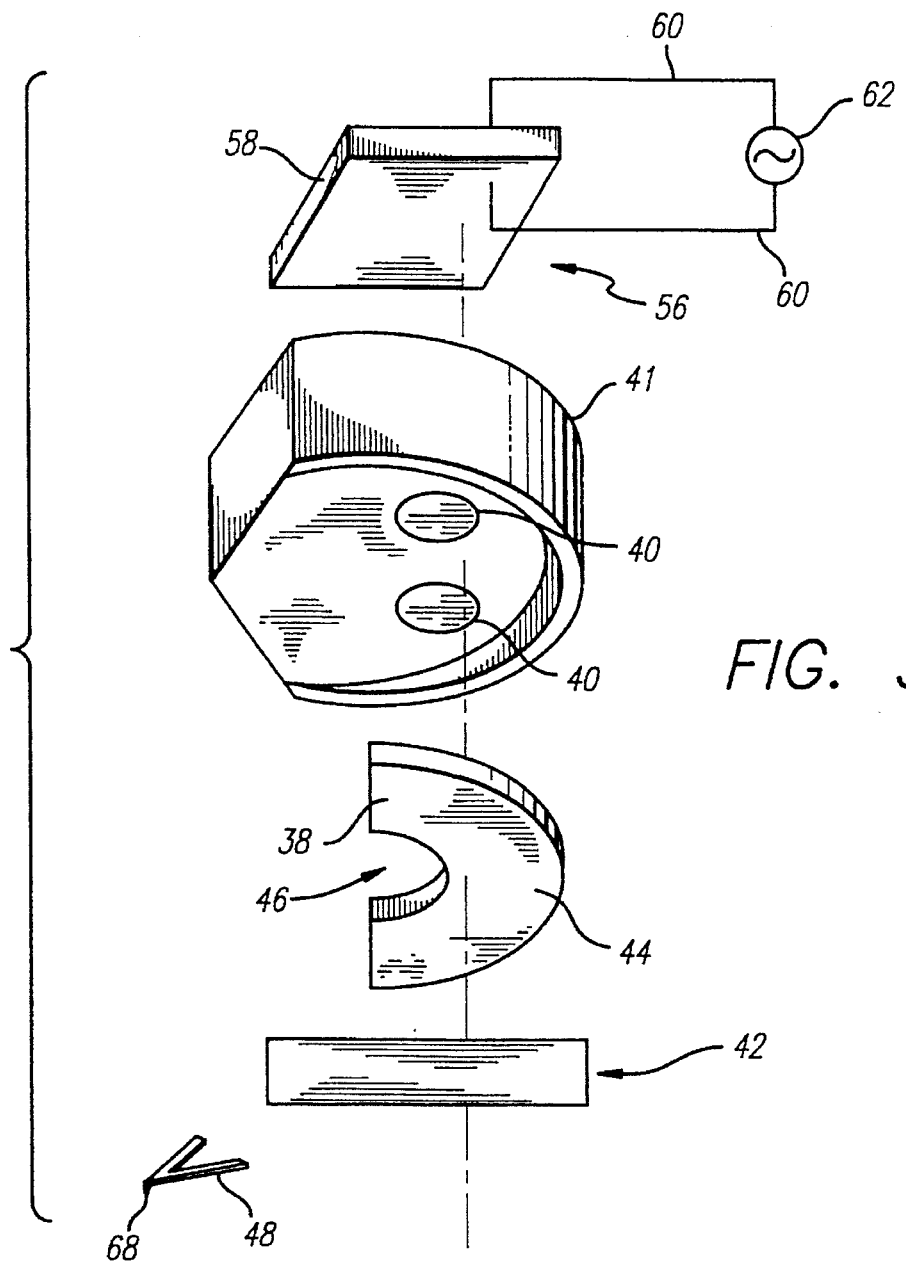
FIG. 3 is an enlarged, exploded view showing the mounting of the optical lever arm assembly of the scanning force microscope of the invention.
Figure 4:
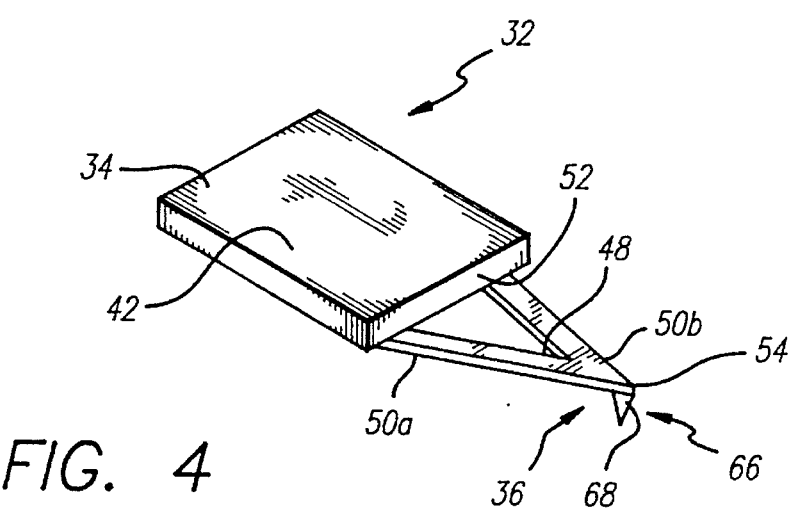
FIG. 4 is an enlarged perspective view of the integral support member, cantilever arm, and probe tip of the optical lever arm assembly of the present invention.
Figure 5:
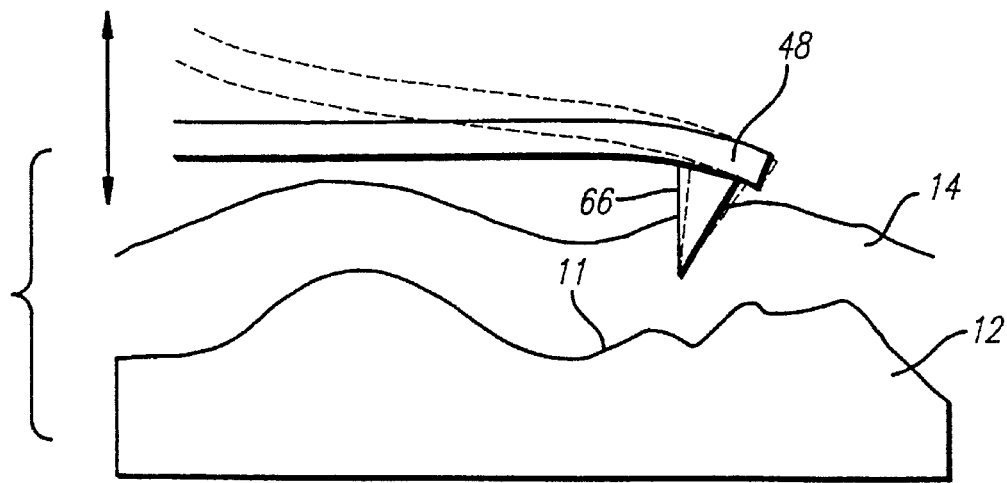
FIG. 5 is an illustration of motion of the oscillating cantilever arm while the probe is maintained in contact with the surface of a specimen in the method of the invention.

As is illustrated in the drawings, and with particular reference to FIGS. 1, 2 and 5, the invention is embodied in a resonance contact scanning force microscope 10 for examining the surface contours 11 of a specimen 12, which is generally less than ½ inch in diameter and 0.1 to 2 mm thick. The surface of the specimen is typically covered with a contamination layer 14 in normal ambient conditions, which represents an attractive region primarily due to surface attraction of the probe tip of the scanning force microscope.

Referring to FIGS. 1 and 2, in one presently preferred embodiment, the resonance contact scanning force microscope of the invention includes a stationary body 16 having a removable lower base 18 secured to the body by screws or bolts, with a chamber 20 for receiving the specimen. The body is typically supported by a stationary support (not shown) also supporting a scanning means 22 for mounting of the specimen for examination, raster scanning the specimen in X and Y directions relative to the body, as shown by the arrows, that is, horizontally in two dimensions or degrees of freedom, and for moving the specimen in a vertical or Z dimension or degree of freedom relative to the body, as shown by the arrow, and as will be further explained. The scanning means is thus stationarily mounted with respect to the body of the microscope, and can also be secured to the body. The scanning means can for example comprise a piezo tube 24 with a support stage 26 for the specimen at the distal end 28 of piezo tube, which is typically driven in the X, Y and Z dimensions by electrical drive voltage signals from a control unit, as is further discussed below.

The stage also may include a magnet 30, to allow a specimen to be mounted by adhesion onto a small magnetic steel plate which can thus be magnetically secured on the top of the stage, allowing for the convenient interchange of specimens to be examined by the instrument.

Figure 6:
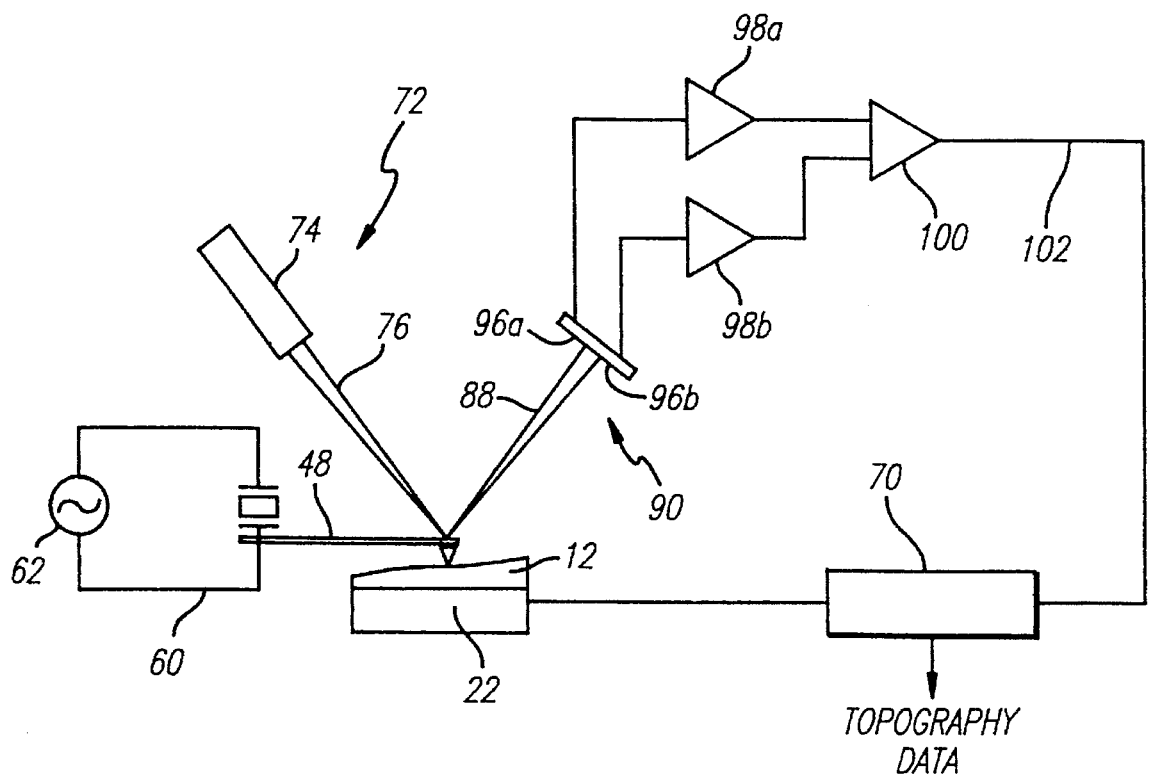
FIG. 6 is a schematic diagram of a feedback control circuit for the resonance contact scanning force microscope of the present invention.
Figure 7:
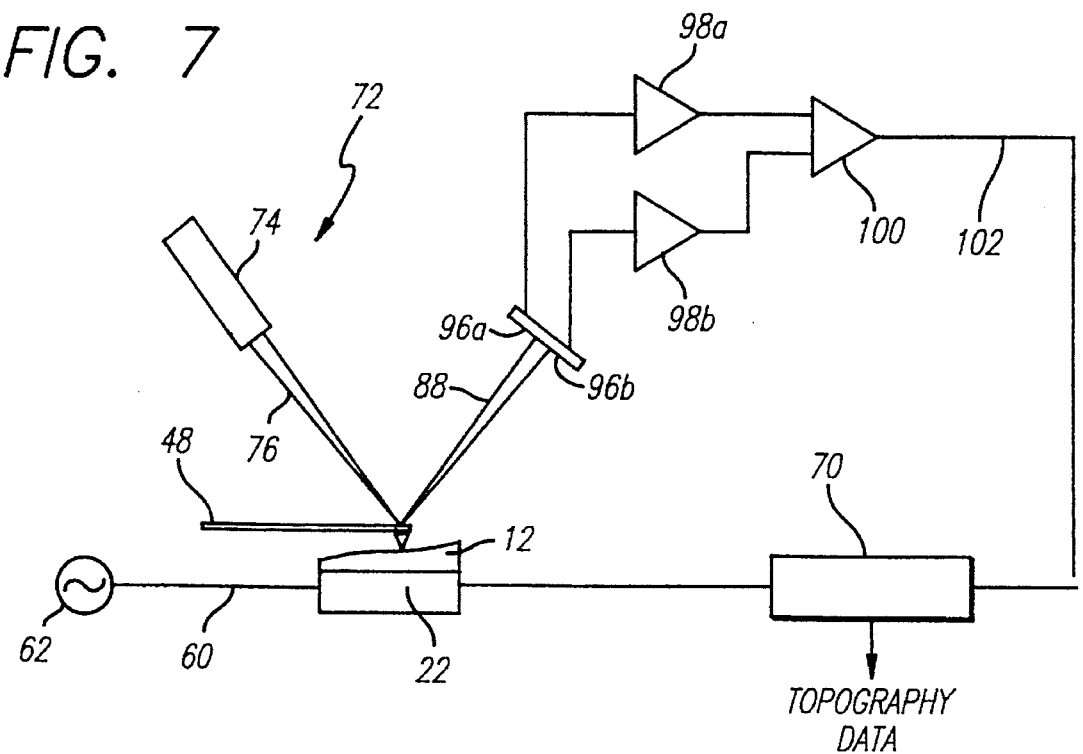
FIG. 7 is a schematic diagram of an alternate feedback control circuit for use with the resonance contact scanning force microscope of the present invention.

As is best illustrated in FIGS. 1–4, the microscope includes an optical lever arm assembly 32 having a first end 34 secured to the body, and a free end 36. The optical lever arm assembly is preferably secured to the body of the microscope by a half washer member 38 of magnetic steel, which can be readily magnetically secured to one or more magnetized portions 40 mounted to the microscope body, and currently preferably disposed in a cantilever holder member 41. An integral cantilever support member 42 is also currently preferably mounted to a central portion 44 of the half washer member, extending to the open middle portion 46 of the half washer member. A reflective cantilever arm 48 is carried by the integral cantilever support member. Referring to FIGS. 1 and 6, an oscillation drive means 56 is also preferably provided, and currently preferably comprises a piezo-ceramic transducer 58, secured between a piezo holder member 59, which is mounted to the body or to the base, and the cantilever holder member. The piezo-ceramic transducer is preferably driven by oscillating voltage conducted by electrical lines 60 connected to a voltage oscillator 62, for oscillating the cantilever arm at a desired frequency. Alternatively, the specimen can be oscillated relative to the cantilever arm, by control of the scanning means by the oscillator, as is shown in FIG. 7.

The oscillating frequency of the cantilever is preferably selected to be a very high harmonic of the fundamental resonance frequency of the cantilever arm in a range of from about 0.1 to about 2 MHz, and is currently preferably above about 0.4 MHz. In actual practice, the high harmonic frequency is selected by varying the oscillation frequency until the oscillation frequency reaches a high harmonic and the amplitude of noise from the oscillating cantilever arm reaches a minimum. The minimum frequency should be selected to effectively prevent introduction of audio frequencies up to 20 KHz into the feedback loop, and the preferred minimum of about 100 KHz has been found to be effective for this purpose. Also, if amplitude of oscillation of the cantilever arm is sufficiently small, the noise reduction effect will not occur. Therefore, in order to maintain the amplitude of oscillation above an effective minimum, the cantilever arm is typically driven to oscillate at an amplitude above about 10 Å, and generally in the broad range of between about 10 Å and 300 Å.

The reflective cantilever arm 48 is currently preferably formed in the shape of a triangle from first and second arms 50a, 50b, and is preferably secured at one end to the oscillator drive means 56 at the free end 52 of the integral cantilever support member, and the arms of the cantilever arm are joined together at their free ends 54.

The reflective cantilever arm preferably is relatively soft, having a relatively low force modulus, generally in the range of about 0.05 to 0.1 nano-Newtons/nanometer, to allow the cantilever arm to oscillate at high frequencies, while maintaining the probe tip in contact with the surface of the specimen. The arms of the cantilever arm are typically about 18 microns wide, about 0.5 to 1.0 microns thick, typically about 0.6 microns thick, and about 200 microns long, and are secured to the integral cantilever support member about 120 microns apart. The cantilever arm so constructed typically has a free air resonance frequency of about 10 KHz. The silicon nitride material (available from Park Scientific Instruments, Topometrix, and Digital Instruments) from which the cantilever arm is made allows the cantilever arm to bow and flex as much as 30°, amplifying the deflection of the laser beam. The integral cantilever support member and the reflective cantilever arm are so small that they are most conveniently etched from silicon nitride, although other materials such as silicon which can be etched or lend themselves to fine machining and which can provide a reflective surface, such as are well known to those skilled in the art of manufacturing of integrated circuit chips, may be suitable as well.

Attached to the free end 54 of the cantilever arm is a probe means 66 including a distal needle-like probe tip 68 adapted to maintain contact with and follow the surface contours of the specimen. The microscope preferably also includes a processing unit with feedback control means 70 for driving the piezo tube in the vertical or z dimension as the probe tip traverses the contours of the specimen, to maintain a substantially constant force of the probe tip against the surface of the specimen even as the cantilever arm oscillates.

With reference to FIGS. 1, 2, 6 and 7, deflection measuring means 72 are also mounted to the body of the microscope for measuring deflection of the probe at the free end of the cantilever arm as the probe follows the contours of the surface of the specimen. In a preferred embodiment, the deflection measuring means includes a laser light source means 74 such as a laser diode with associated optics, mounted in the upper portion of the body for producing a focused laser beam 76 directed at and deflected by the free end of the reflective cantilever arm. One preferred laser diode is a 3 milliwatt laser diode which produces a beam in the 670 nm range, and is commercially available. An opening 78 or transparent window is provided in the removable base to allow the laser beam to pass through to the cantilever arm. Adjustment screws 80 may be provided for adjusting the alignment and aiming of the laser light source, mounted in threaded access ports 81 provided in body. A reflective means such as the planar mirror 82 is preferably mounted in the interior of the body at a distal end of an adjustment screw (not shown) through a threaded access port to reflect the deflected beam 88 to a photosensor 90 mounted to the body of the microscope for receiving the deflected laser beam. The photosensor preferably generates an electrical deflection signal 102 in response to the deflected laser beam indicative of an amount of deflection of the laser beam by the cantilever arm.

As is shown in FIG. 2, the photosensor is preferably mounted to the body of the microscope to receive the deflected laser beam through photosensor port 92 in the body, and is typically formed as an array of four photodetectors 94, in which the top pair 96a is coupled to provide a combined signal, and the bottom pair 96b is coupled to provide a combined signal, with the two combined signals being received by preamplifiers 98a,b and differential amplifier 100 to provide a combined deflection signal 102. The deflected laser beam is typically targeted at a central point between the top and bottom portions of the photosensor, and the combined deflection signal 102 is processed in the processing unit 70 for generating feedback to the z-piezo of the scanning means, and topographical position signal output data for imaging the surface of the specimen. Although the laser beam deflected by the rapidly oscillating cantilever arm will also oscillate at the selected high harmonic resonance frequency, because the bandwidth of the photosensor is about 20 KHz, the photosensor will essentially measure a median deflected laser beam excursion, and any effect of attenuation of the deflection signal due to the oscillation will be very small. The processing unit provides feedback to maintain a substantially constant amount of force of the probe tip in constant contact with the surface of the specimen, as is illustrated in FIG. 5. Although the cantilever arm oscillates rapidly, varying the amount of force of the probe tip actually applied at any given instant, due to the limited bandwidth of the photosensor, the force detected is also a median value, which is kept substantially constant. The processing unit is electrically connected to the scanning means 22 for raising and lowering the specimen with respect to the probe tip for increasing or decreasing the force of the probe tip against the specimen surface to maintain the substantially constant amount of force of the probe tip against the specimen surface.

Figure 10:
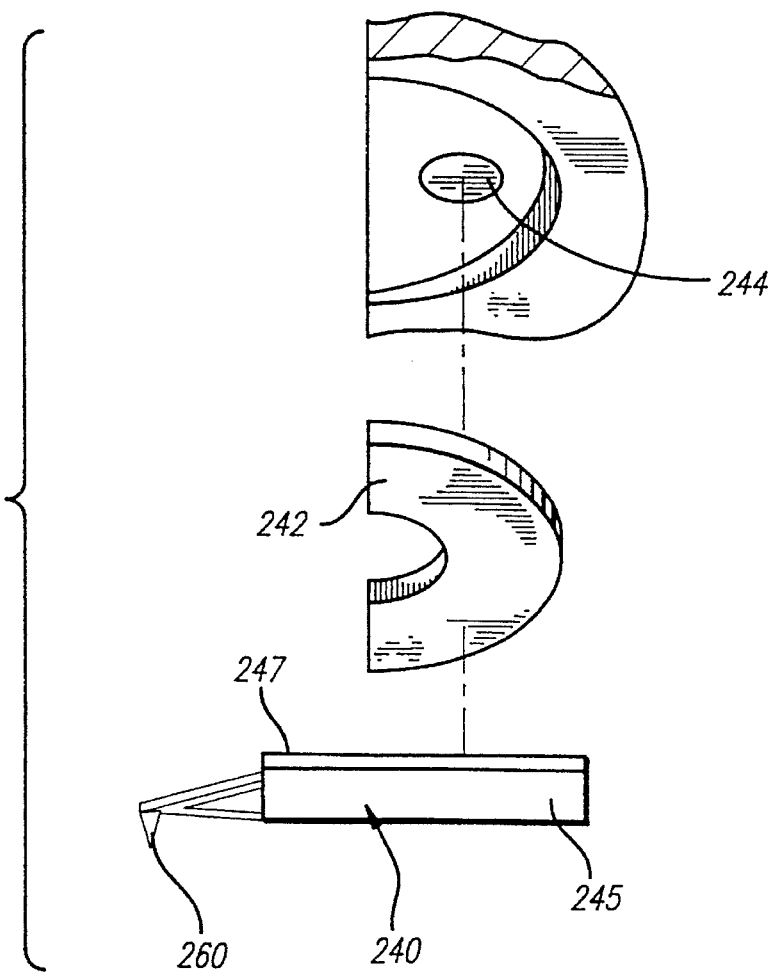
FIG. 10 is an enlarged, exploded view showing the mounting of the optical lever arm assembly of the scanning force microscope of FIG. 8.
Figure 9:
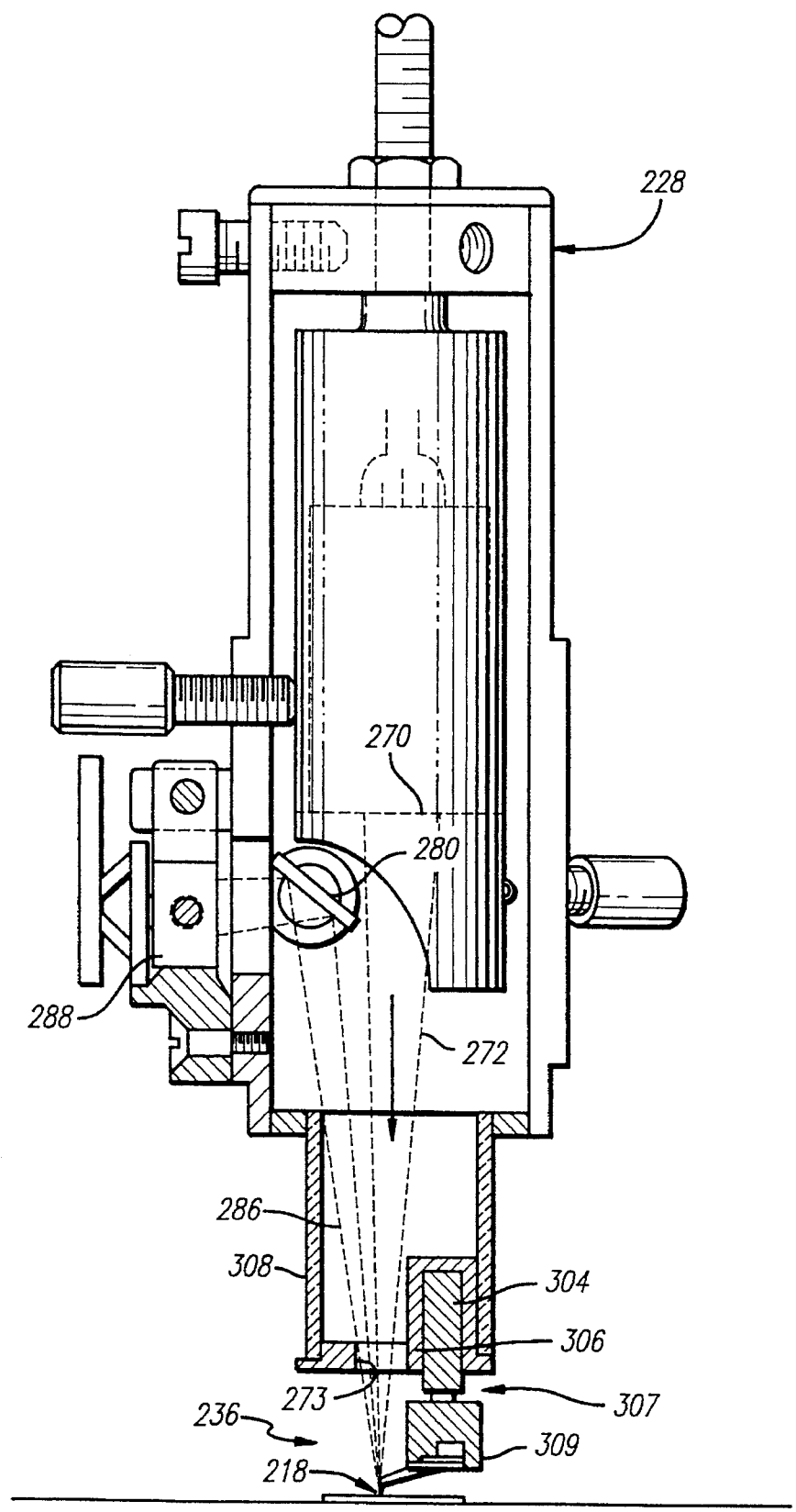
FIG. 9 is a cross-sectional elevational view of the resonance contact scanning force microscope of FIG. 8.

With reference to FIGS. 8–10, illustrating an alternate free standing type of scanning force microscope implementing the principles of the invention, the free standing resonance contact scanning force microscope of this embodiment has a stationary body 212 including a lower base 214. The base is secured to the body by screws or bolts, with adjustable motor driven legs 216a,b,c for supporting the body of the microscope on a substrate 213 and moving the body of the microscope in a vertical dimension relative to a specimen 218 mounted with respect to the substrate. Each of the motor driven legs includes an optically encoded screw drive motor 217 connected to a control unit, as is described later, which coordinates the operation of the legs in response to position signals from the optically encoded screw drive motors, so that the motors operate in unison to raise and lower the microscope uniformly. The specimen to be examined can in fact consist of a portion of the substrate, and can therefore in principle be of any size or weight, such as the wing of an aircraft, or a desk top, for example. The base of the microscope preferably includes a middle bore 220 for extension of the sensor head to the specimen to be examined.

A scanner assembly shell 228 is preferably mounted to the upper side of the base. The upper end of the scanner shell assembly provides a site for mounting a pivot 234 for the body of the generally cylindrical inner sensor assembly, or kernel, which includes a laser light source and sensor head assembly 236.

The sensor head assembly 236 preferably includes an optical lever arm assembly 240 secured to the body of the inner sensor assembly, and preferably includes a half washer member 242 of magnetic steel, magnetically secured to a magnet 244 secured to the body of the inner sensor assembly. An integral cantilever support member 245 is mounted to a central portion of the half washer member, extending to the open middle portion of the half washer member. A relatively soft, reflective cantilever arm 246 formed in the shape of a triangle from first and second arms is secured at one end to the free end 247 of the integral cantilever support member and joined together at their free ends 250. Attached to the free end 250 of the cantilever arm is a probe means 260 including a distal needle-like probe tip 262 adapted to contact and follow the surface contours of the specimen.

A laser light source means 270 such as a laser diode with associated optics, is mounted in the upper portion of the body for producing a focused laser beam 272 directed at and deflected by the reflective cantilever arm. An opening 273 is provided in the removable base to allow the laser beam to pass through to the cantilever arm. A reflective means such as the planar mirror 280 is preferably mounted in the interior of the body at a distal end of an adjustment screw through a threaded access port (not shown) to reflect the deflected beam 286 to a photosensor 288 mounted to body for receiving the deflected laser beam.

As explained previously, with reference to FIGS. 2 and 6, the photosensor preferably generates an electrical output signal in response to the deflected laser beam indicative of the degree of deflection of the laser beam by the cantilever arm.

Referring to FIGS. 8 and 9, the mechanism for raster scanning the sensor head preferably includes a pair of stacked piezo drivers 300 disposed in the scanner shell assembly oriented horizontally at right angles to each other for low resolution or large scale x and y raster scanning movements ranging approximately from zero to 400 microns, and corresponding opposing coil compression springs 302. The large motion horizontal piezo drivers 300 and the opposing coil springs are mounted between the inner scanner assembly and the scanner shell in push rods 296 having push rod chambers for containing and securing one end of the piezo drivers and springs. Large scale motion of the sensor head assembly in the vertical or Z dimension approximately from zero to 20 microns is controlled by a stacked piezo driver 304 mounted vertically in a holder 306 preferably formed of an insulating ceramic such as that sold under the trade name MACOR, available from Corning, mounted, for example by an adhesive such as epoxy, in a portion of a piezo tube driver 308, of the type which is well known in the art.

The upper end of the piezo driver 304 is preferably adhesively secured to the holder such as by epoxy, and the lower end of the piezo driver 304 is preferably adhesively secured, such as by epoxy 307 to a sensor head mounting block 309, preferably formed of an insulating ceramic such as MACOR, to which the magnet of the sensor head assembly is secured. The range of motion of the stacked piezo drivers is of course dependent upon the piezo material selected and the length of the piezo stack. The piezo tube driver 308 is mounted to the lower end of the body of the inner sensor assembly, to provide for small scale x, y, and z motion of sensor head assembly. The small scale motion achievable with the piezo tube driver ranges approximately from zero to 5 microns in the vertical or z direction, and approximately from zero to 10 microns in the horizontal or x and y dimensions, depending upon the size of the cantilever arms of the sensor head assembly, typically with an atomic resolution as small as approximately 0.02 nm in the vertical dimension, and approximately 0.03 nm in the horizontal dimension.

The scanning means preferably also includes feedback control means 310 for driving the piezo tube in the vertical dimension as the probe tip traverses the contours of the specimen, to maintain substantially constant contact with a substantially constant force of the probe tip against the surface of the specimen. The control means is also preferably operative to drive the piezo tube to oscillate the cantilever when the probe is substantially in contact with the surface of the specimen at a desired frequency which is a very high harmonic of the fundamental resonance frequency of the cantilever arm, and which is preferably between about 0.1–2 MHz. The oscillation frequency is currently typically above about 0.4 MHz. For this purpose, the control means can include, for example, means for generating about a 5 to 10 volt sine wave signal to be applied to the piezo driver for control of movement in the z direction through a capacitor, such as a 0.1 mfd capacitor (not shown). Alternatively, the oscillation of the cantilever arm can be driven by suitable control of the stacked piezo driver 304.

The control means 310 preferably comprises microprocessor means electrically connected to the photosensor means by line 313 to receive the output signals indicative of deflection of the laser beam from the optical lever arm means, and for generating the error signal indicative of a variance from the constant amount of force of the probe tip against the specimen surface. The control means is electrically connected to the piezoelectric drivers by control lines 314a–c for raising and lowering the sensor head assembly with respect to the specimen for increasing or decreasing the force of the probe tip against the specimen surface to maintain the substantially constant amount of force of the probe tip against the specimen surface, and for raster scanning the sensor head assembly in a horizontal plane in X and Y directions. The optically encoded screw drive motors 217 of the motor driven legs are also connected to the control means 310 by control lines 316 enabling the control means to receive the optically encoded position signals from the drive motors and to uniformly coordinate the operation of the drive motors in raising and lowering the microscope.

In the method of the invention for resonance contact scanning force microscopy, when the probe tip is substantially in contact with the surface of the specimen, the cantilever arm of the microscope is oscillated toward and away from the specimen surface at a desired frequency in cycles of near and far excursions relative to the specimen surface, while the probe tip is maintained in contact with the surface for the specimen. The detection scheme is most effective at a high resonance harmonic of the fundamental resonance frequency of the cantilever arm, preferably between about 0.1 and 2.0 MHz, and currently above about 0.4 MHz.

It has been found that this form of resonance contact modulation of the cantilever and probe tip at a high resonance harmonic of the fundamental resonance frequency of the cantilever arm, is useful in reducing random noise at other frequencies. Experimentally, the resonance contact mode of operating a scanning force microscope has been found to reduce noise in images of specimens 3 to 6 fold, and streaking is greatly reduced. In addition, maximum feedback control settings before oscillation can be increased up to two fold, allowing for faster scan rates for comparable image quality. For example, in scanning a specimen in standard contact mode with a 75 micron scanner, with a scan range of about 50 microns at a scan rate of 4 lines per second, hydroplaning height variations of about 600 Å and noise in selected areas of from 30–50 Å can be dramatically reduced by scanning in a resonance contact mode at 473 KHz to less than 10 Å. In scanning a specimen with a scan range of 400 nm, with 15–20 Å features, at a high scan rate of 5 lines per second with a 1 micron scanner, noise of about 10 Å from scanning in a standard contact mode can be reduced by scanning in a resonance contact mode at 217 KHz to about 2–3 Å. Scanning in a resonance contact mode at 448 KHz over the region of the specimen further reduced noise to less than 2 Å.

The motion of the cantilever arm is measured, and a deflection signal indicative of deflection of the free end of the cantilever arm is preferably generated by projection of a laser beam focused on the free end of the reflective cantilever arm where the probe is located, which reflects the beam to a photosensor which generates a deflection signal tracking the instantaneous deflection of the cantilever arm. The deflection signal is preferably used for generating a position feedback signal for maintaining the probe in contact with the specimen surface. The output topographical signal data may also be stored in a memory means (not shown), for use in displaying an image of the surface of the specimen.

It will be appreciated that the apparatus and method of the invention provide for a resonance contact scanning force microscope which can be used for high speed scans and real time imaging of the surface of a specimen with a substantial reduction in noise in specimen images due to tip-surface interaction and acoustic noise, resulting in improved resolution from both high and low speed scans.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A resonance contact scanning force microscope for examining surface contours of a specimen, the microscope comprising:

a cantilever arm having a first free end and a second end secured to a means to move said cantilever arm, said cantilever arm having a fundamental resonance frequency;

probe means secured to said free end of said cantilever arm, said probe means including a probe tip adapted to follow the surface contours of the specimen;

scanning means for scanning said specimen relative to said probe tip;

oscillator drive means for causing said means to move said cantilever arm to oscillate said cantilever arm at a desired harmonic frequency of said fundamental resonance frequency above the cantilever arm fundamental resonance frequency;

deflection measuring means for measuring the deflection of said free end of said cantilever arm and for generating a deflection signal indicative of an amount of deflection of the free end of said cantilever arm; and probe position feedback control means for maintaining said probe tip in substantially constant contact with the surface of the specimen in response to said deflection signal.

2. The microscope of claim 1, wherein said means for measuring deflection of said free end of said oscillating cantilever arm comprises laser light source means mounted to said body for producing a focused light beam directed at and deflected by said free end of said cantilever arm, photosensor means mounted to said body for receiving said beam deflected by said cantilever arm, and means connected to said photosensor means to generate said deflection signal.

3. The microscope of claim 2 wherein said light beam is a laser light beam.

4. The microscope of claim 1, wherein said oscillator drive means is connected to said cantilever arm and is operative to drive said cantilever arm with an oscillation amplitude between about 10 Å and 300 Å.

5. The microscope of claim 1, wherein said oscillator drive means is connected to said scanning means and is operative to drive said scanning means relative to said cantilever arm with an oscillation amplitude between about 10 Å and 300 Å.

6. The microscope of claim 1, further including means to create an image of the specimen from said deflection signal.

7. The microscope of claim 1, further including display means for displaying an image of the surface of the specimen based upon said deflection signals.

8. A method for operating a scanning force microscope for examining surface contours of a specimen, said microscope having a cantilever arm and means to move said cantilever arm, said cantilever arm having a first end secured to said means to move said cantilever arm and a free end, said cantilever arm having a fundamental resonance frequency, said probe means secured to said free end of said cantilever arm and including a probe tip adapted to follow the surface contours of the specimen with a substantially constant amount of force, scanning means for scanning said specimen relative to said probe tip, deflection measuring means for measuring deflection of said free end of said cantilever arm and for generating a deflection signal indicative of an amount of deflection of said free end of said cantilever arm, the steps of the method comprising:

oscillating said cantilever arm at a desired harmonic frequency of said fundamental resonance frequency above said fundamental resonance frequency while maintaining said probe tip in substantially constant contact with the surface of said specimen; and creating a representation of a physical characteristic of said surface of said specimen based upon said deflection signal.

9. The method of claim 8, wherein said step of oscillating said cantilever arm relative to the surface of said specimen comprises oscillating the cantilever arm at a frequency between about 0.1 and about 2.0 MHz.

10. The method of claim 8, wherein said step of oscillating said cantilever arm relative to the surface of said specimen comprises oscillating the cantilever arm at a frequency above about 0.4 MHz.

11. The method of claim 8, wherein said step of oscillating said cantilever arm relative to the surface of said specimen comprises driving oscillations of the cantilever arm at an amplitude between about 10 Å and 300 Å.

12. The method of claim 8, wherein said step of oscillating said cantilever arm relative to the surface of said specimen comprises driving oscillations of the specimen relative to the cantilever arm at an amplitude between about 10 Å and 300 Å.

13. The method of claim 8, further including the step of generating a probe position feedback signal based upon said deflection signal for maintaining the probe in contact with the surface of the specimen.

14. A scanning force microscope, comprising:

a probe assembly, said probe assembly including a cantilever beam fixed to said probe assembly at a first end of said cantilever beam, said cantilever beam including a pointed probe affixed to a second free end of said cantilever beam which is free to move relative to said first end, and said cantilever beam having a natural frequency of vibration;

means to position a sample in a fixed relationship to said probe assembly;

means to move said fixed first end of said cantilever beam relative to said sample;

means to measure the position of the free end of said cantilever beam relative to said sample;

means to position said probe in contact with said sample with a substantially constant force;

means to oscillate said cantilever beam at a frequency which is a harmonic of the natural frequency of vibration of said cantilever beam; and means to derive from said measure of position of said free end of such cantilever beam and the position of said sample a representation of a physical characteristic of said sample.

15. The scanning force microscope of claim 14, wherein said means to measure the position of the free end of said cantilever beam further comprises:

photosensor means operative to provide an output indicative of the deflection of said cantilever beam; and focused light beam means positioned to direct a focused light beam to a reflective part of said cantilever beam and said photosensor means positioned to receive said focused light beam after reflection of said focused light beam from said cantilever beam.

16. The scanning force microscope of claim 15 wherein said focused light beam comprises a laser light beam.

17. The scanning force microscope of claim 14 wherein said means to derive said representation comprises an electronic computer.

* * * * *